(12) United States Patent
Park et al.

(10) Patent No.: US 12,303,956 B2
(45) Date of Patent: May 20, 2025

(54) METHOD OF MANUFACTURING ALUMINUM PLATE

(71) Applicant: ALUTEC CO., LTD, Nonsan-si (KR)

(72) Inventors: Do Bong Park, Seoul (KR); Jin Woo Park, Daejeon (KR); Seong Heon Kim, Daejeon (KR)

(73) Assignee: ALUTEC CO., LTD, Nonsan-si (KR)

( * ) Notice: Subject to any disclaimer, the term of this patent is extended or adjusted under 35 U.S.C. 154(b) by 314 days.

(21) Appl. No.: 17/965,935

(22) Filed: Oct. 14, 2022

(65) Prior Publication Data

US 2024/0066576 A1 Feb. 29, 2024

(30) Foreign Application Priority Data

Aug. 25, 2022 (KR) .................. 10-2022-0106678

(51) Int. Cl.
| | |
|---|---|
| B21C 23/06 | (2006.01) |
| B21B 3/00 | (2006.01) |
| B22D 11/00 | (2006.01) |
| C21D 8/02 | (2006.01) |
| C22C 1/02 | (2006.01) |
| C22C 21/00 | (2006.01) |

(52) U.S. Cl.
CPC ............ B21C 23/06 (2013.01); B21B 3/00 (2013.01); B22D 11/003 (2013.01); C21D 8/0236 (2013.01); C21D 8/0268 (2013.01); C21D 8/0273 (2013.01); C22C 1/026 (2013.01); C22C 21/00 (2013.01); B21B 2003/001 (2013.01)

(58) Field of Classification Search
CPC .. B21C 23/06; B21B 2003/001; B22D 11/003
See application file for complete search history.

(56) References Cited

U.S. PATENT DOCUMENTS 4,123,011 A * 10/1978 Kajiwara ............... B65H 19/18
242/551

FOREIGN PATENT DOCUMENTS

| KR | 100230685 B1 | * 11/1999 |
| KR | 100412417 B1 | * 12/2003 |
| KR | 10-2010-0104731 A | 9/2010 |
| KR | 10-2011-0114101 A | 10/2011 |
| KR | 101148064 B1 | * 5/2012 |
| KR | 10-2015-0094983 A | 8/2015 |

* cited by examiner

*Primary Examiner* — Bobby Yeonjin Kim
*Assistant Examiner* — P Derek Pressley
(74) *Attorney, Agent, or Firm* — NKL LAW; Jae Youn Kim

(57) ABSTRACT

An aluminum plate manufacturing method capable of achieving an enhancement in productivity through a reduction in the number of processes and a reduction in processing time is disclosed. In the aluminum plate manufacturing method, a plate is rolled after being extruded to a desired thickness. Accordingly, it is possible to reduce the number of processes and a processing time and, as such, achieving an enhancement in productivity, as compared to a conventional manufacturing process using only rolling.

3 Claims, 3 Drawing Sheets

METHOD OF MANUFACTURING ALUMINUM PLATE

BACKGROUND OF THE INVENTION

Field of the Invention

The present invention relates in general to a method of manufacturing an aluminum plate, and more particularly to an aluminum plate manufacturing method in which a coil is manufactured through extrusion, and is then subjected to rolling. The present invention relates to an aluminum plate manufacturing method capable of achieving rolling of an extruded coil, thereby remarkably reducing the number of processes and a processing time and, as such, achieving an enhancement in productivity, as compared to conventional cases in which rolling of an extruded coil is known to be impossible because, when an extruded coil is subjected to rolling, rupture occurs at connection portions of billets.

In particular, the present invention relates to an aluminum plate manufacturing method in which a plate is rolled after being extruded to a desired thickness, thereby being capable of reducing the number of processes and a processing time and, as such, achieving an enhancement in productivity, as compared to a conventional manufacturing process using only rolling.

DESCRIPTION OF THE RELATED ART

Aluminum is not only light, easily castable, well alloyable with other metals, and easily machinable at room temperature and high temperature, but also exhibits electrical and thermal conductivity. In this regard, aluminum is widely used in industry as a whole.

Meanwhile, in order to eliminate various problems including environmental pollution caused by excessive consumption of fossil fuels in association with vehicles, not only is development of an electric vehicle (EV) and a fuel cell electric vehicle (FCEV) being conducted, but also development of a hybrid electric vehicle (HEV) having hybrid characteristics of an internal combustion engine and an electric vehicle is being conducted. These vehicles essentially use a battery.

As such a battery, a nickel battery, a lithium battery, or the like is mainly used. Such a battery has a structure configured to convert electrical energy into chemical energy, to store the chemical energy, and to convert the stored chemical energy into electrical energy in order to use the electrical energy, using a positive electrode material, a negative electrode material, an electrolyte, a separation membrane, etc.

Aluminum is used in various fields including a battery case, a battery pack housing, various frames, etc. of the above-described vehicle. Such aluminum is coiled in the form of a coil after being formed into a plate having a certain thickness, and is then supplied to a production line on which various elements will be manufactured.

Various method of manufacturing an element using an aluminum plate as mentioned above have been developed, and examples in which a plate is manufactured are disclosed in the following Patent Documents 1 to 3.

Patent Document 1 discloses a manufacturing method of an aluminum alloy plate including a plate casing step including an injection means installation procedure of installing a nozzle having a symmetrical or asymmetrical shape configured to guide a molten AA5083 alloy at one side of a molten metal injection means such that the nozzle contacts a pair of rollers, a roller rotating procedure of providing rotation force to the pair of rollers, thereby rotating the pair of rollers in different directions, a molten metal supply procedure of supplying the molten AA5083 alloy to an interior of the molten metal injection means, a molten metal injection procedure of injecting the molten AA5083 alloy supplied to the molten metal injection means between the pair of rollers, a molten metal solidification procedure of pressurizing and solidifying the molten AA5083 alloy injected between the pair of rollers, a rotation speed varying procedure of selectively varying a rotation speed of the pair of rollers in accordance with a variation in a pressure applied to the pair of rollers in the molten metal solidification procedure, a plate discharge procedure of discharging an aluminum alloy plate formed through solidification by the pair of rollers, a rolling step of rolling the aluminum alloy plate, and a thermal treatment step of thermally treating the rolled aluminum alloy plate such that the aluminum alloy plate has crystal grains of 10 µm or less and a precipitation phase of an $Al_6Mn$ phase of 20 nm or less.

Patent Document 2 discloses an aluminum alloy plate rolling method including a material introduction step of introducing an aluminum alloy material into a crossing type roller including a plurality of roller units each including an upper crossing roller and a lower crossing roller installed such that central lines thereof cross each other, in order to roll the aluminum alloy material, and a crossing rolling step of rolling the aluminum alloy material in a state in which the aluminum alloy material passes the upper crossing roller and the lower crossing roller, wherein the upper crossing roller and the lower crossing roller are installed to be inclined with respect to a normal line in an introduction direction of the aluminum alloy material, and the roller units are sequentially arranged in the introduction direction of the aluminum alloy material such that the upper crossing rollers and the lower crossing rollers of adjacent ones of the roller units are installed to be inclined in opposite directions with respect to the normal line of the introduction direction of the aluminum alloy material, respectively.

Patent Document 3 disclosures an aluminum alloy plate manufacturing method including a step of rolling an aluminum alloy plate between an upper roller and a lower roll having a variable rotation speed ratio, the aluminum alloy plate including 0.71% of Si, 0.5% of Fe, 0.24% of Cu, 0.12% of Mn, 0.9% of Mg, a balance of Al, and a trace of inevitable impurities, wherein the aluminum alloy plate is subjected to differential speed rolling at a reduction ratio of 45 to 55%, a lower roll speed of 2.7 to 6.2 meters per minute (MPM), and a rotation speed ratio of 1:2.7 to 3.3 between the facing lower and upper rolls.

Although various technologies for manufacturing an aluminum plate have been developed, as mentioned above, in these technologies, in general, an aluminum plate is manufactured by melting and alloying aluminum, casting the alloyed aluminum into a slab, repeatedly hot-rolling the slab several tens of times, to form a plate have a predetermined thickness, and then repeatedly cold-rolling the plate several times such that the plate has a further reduced thickness.

That is, the generally-known aluminum plate manufacturing methods are constituted by one of rolling or extrusion procedures. As the rolling method, the methods as mentioned above are used. As the extrusion method, a method, in which a billet is cast, and is then extruded to have a desired thickness under the condition that the billet passes through an extrusion mold, is used.

Among the above-mentioned aluminum plate manufacturing methods, rolling is a process of forming a plate having a uniform thickness, and has an advantage in that a plate having a uniform thickness and a great width can be obtained because a metal slab or plate is introduced between rollers, to have a thinner and flat structure. However, rolling has a drawback in that a curved structure, a hollow structure having a tubular shape, or the like cannot be realized, as compared to extrusion. Furthermore, rolling has a drawback in that the rolled product only has a uniform thickness when viewed in cross-section, and a variation in thickness is possible only through overlap of cross-sections using bending, welding, forging, or cutting and, as such, it is necessary to perform a subsequent machining process.

Furthermore, as rolling, both a direct chill casting (DC) process of casting a slab, and manufacturing a plate from the cast slab and a continuous casting (CC) process of manufacturing a plate from a molten metal cannot manufacture a plate having a desired thickness in a single pass. In these processes, the plate passes between rollers several times or several tens of times in order to gradually reduce a thickness thereof. For this reason, rolling and thermal treatment should be performed a number of times in order to obtain a desired product thickness and, as such, there are drawbacks in that the manufacturing process is complex, and a lot of time is taken.

Meanwhile, extrusion has advantages in that a structure having various cross-sectional shapes may be manufactured, and various thicknesses may be provided at different positions when viewed in cross-section. However, an extrusion mold may be elastically deformed due to a billet and an extrusion pressure. For this reason, there is a drawback in that a product has a cross-section having a greater thickness when a high pressure is applied to the extrusion mold in an initial stage, whereas the product has a cross-section having a smaller thickness when the applied pressure is lowered in a final stage. In addition, there is a drawback in that a deviation in thickness occurs at different portions of the product in an extruded cross-section. Furthermore, since extrusion is a hot process, there may be a problem in that distortion, shrinkage, etc. of the product may occur in accordance with a degree of heat dissipation in a cooling procedure performed after the hot process.

In addition, although extrusion is plastic working, the cross-section of a product is formed as a material passes through a mold in a single pass, differently from rolling. Accordingly, the minimum thickness of the product realized through extrusion may be varied in accordance with the used material and a desired shape. In a square pipe, which is the most general case, the minimum thickness thereof is limited to 0.8 mm in the case of 1000-series alloys, and is limited to 1.0 mm in the case of 6000-series alloys. For this reason, for manufacture of a product having a smaller thickness, it is necessary to perform a subsequent process. Furthermore, there is a drawback in that only a product having a uniform thickness can be manufactured.

In addition, there are a number of studies attempting to roll an extruded plate after forming the extruded plate in the form of a coil. In such cases, however, it is impossible to manage impurities such as oxides, inclusions, foreign matter, etc. in stages from melting and casting procedures. In particular, in the case of a 5052 aluminum alloy, which is a high strength alloy, the alloy contains 2.2 to 2.8 wt % of magnesium (Mg) and, as such, there is a problem of oxidation upon extrusion at a high temperature. For this reason, this alloy is not subjected to hot extrusion at 500° C. or more, but is extruded at a temperature of less than 500° C. As a result, welding force at connection portions of billets is low and, as such, rupture of the billets occurs during rolling. For this reason, it is known that continuous rolling of an extruded plate is impossible.

RELATED ART LITERATURE

Patent Documents

Patent Document 1: Korean Unexamined Patent Publication No. 10-2010-0104731
Patent Document 2: Korean Unexamined Patent Publication No. 10-2011-0114101
Patent Document 3: Korean Unexamined Patent Publication No. 10-2015-0094983

SUMMARY OF THE INVENTION

Therefore, the present invention has been made in view of the above problems, and it is an object of the present invention to provide a method of manufacturing an aluminum plate, which is capable of reducing the number of processes and the processing time, thereby achieving an enhancement in productivity, by producing a coil through continuous extrusion after casting of a billet, and rolling the coil.

In particular, it is an object of the present invention to provide an aluminum plate manufacturing method in which a material is subjected to a cleaning process in melting and casting steps in order to remove impurities (oxides, inclusions, foreign matter, etc.) from the material, and is then cast into a billet, and the cleaned billet is extruded at a high temperature under the condition that introduction of foreign matter into the billet is prevented, in order to increase welding force of connection portions of billets, for prevention of occurrence of rupture at the connection portions of the billets and, as such, the method continuously proceeds to rolling.

That is, it is an object of the present invention to provide an aluminum plate manufacturing method capable of eliminating problems possibly occurring when an aluminum plate is manufactured only through rolling or when an aluminum plate is manufactured only through extrusion, by manufacturing an aluminum plate through rolling after extrusion, thereby reducing the number of processes and the processing time.

In accordance with the present invention, the above and other objects can be accomplished by the provision of a method of manufacturing an aluminum alloy plate to be used as a material of a can or a case for a battery, the method including a melting and alloying step of melting and alloying a composition for manufacture of an aluminum plate, a cleaning step of removing foreign matter from a resultant melt, for management of a cleaning degree of the melt, a billet casting step of manufacturing a billet having a predetermined width, a predetermined thickness and a predetermined length, a scalping step of removing oxides, foreign matter and an inverse segregation layer from a surface of the billet, a hot extrusion step of extruding the billet to a thickness of 9 to 15 mm at a high temperature of 500° C. or more, a coiling step of coiling a resultant hot-extruded plate, to manufacture a coil, a cold-rolling step of rolling the extruded plate to have a thickness corresponding to 20 to 30% of a thickness of the extruded plate, a tension leveling step of subjecting the rolled plate to tension leveling, to secure a desired flatness of the plate, and a cutting step of cutting the plate after the tension leveling, for manufacture of a battery case using the cut plate.

The method may further include an annealing step of annealing the cold-rolled plate, for stress removal and texture recrystallization, and a stabilization step of increasing strength and recovering physical properties causing degradation in elongation in the cold rolling step.

The hot extrusion step may be performed under a pressure of 200 bar or more, at a speed of 1.0 to 5.0 mm/s and in a temperature range of 500 to 600° C. In order to prevent oxidation and overheat of the plate during hot extrusion, the plate may be extruded in a nitrogen atmosphere between an extrusion mold and an extruder outlet.

The annealing step may be performed at 300 to 400° C. for 1 to 5 hours.

The stabilization step may be performed at 130 to 180° C. for 1 to 5 hours.

The coiling step may be performed by a coiling device. The coiling device may include a plurality of feeding rollers configured to feed an extruded aluminum alloy plate, a pinch roller configured to press the plate fed by the feeding rollers toward a coiler, the coiler including a winding drum configured to rotate in accordance with driving of a driver, thereby winding the plate on the winding drum, and a guide configured to guide the plate such that the plate is uniformly wound without escaping from an end of the winding drum.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
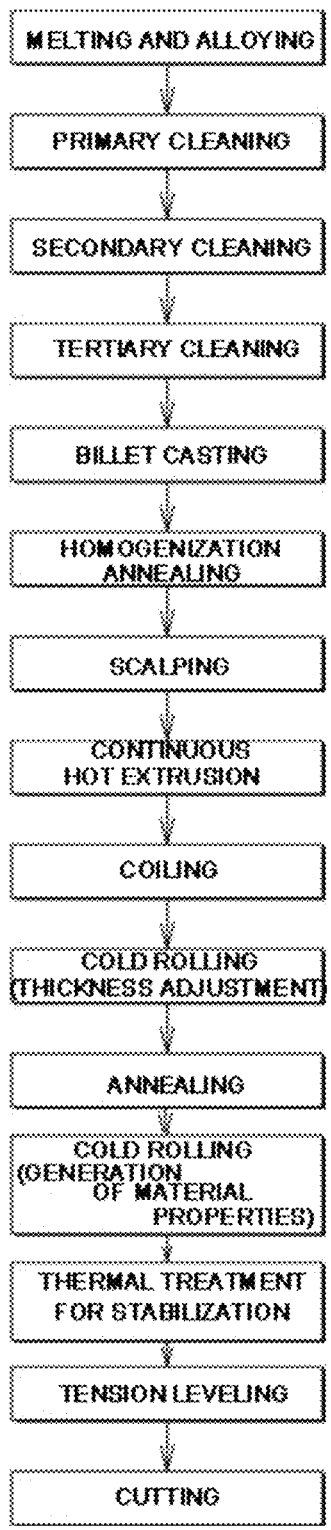
FIG. 1 is a flowchart of a method of manufacturing an aluminum plate using extrusion and rolling in accordance with an exemplary embodiment of the present invention.
Figure 2:
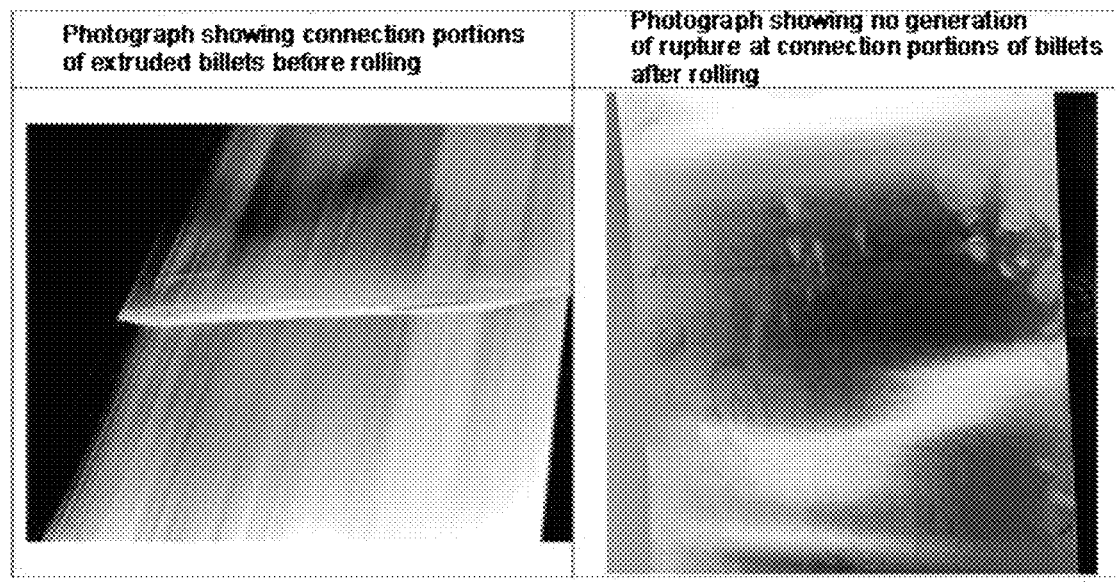
FIG. 2 is photographs of a plate manufactured through the aluminum plate manufacturing method using extrusion and rolling according to the exemplary embodiment of the present invention, respectively showing connection portions of billets before rolling and no generation of rupture at the billet connection portions after rolling.

The present invention may be implemented through various alterations. Accordingly, the present invention will be described through specific embodiments illustrated in the accompanying drawings and detailed descriptions. However, the present invention should not be limited by the specific embodiments, and it is to be appreciated that all changes, equivalents, and substitutes that do not depart from the spirit and technical scope of the present invention are encompassed in the present invention.

The same or similar elements are designated by the same reference numerals. In the following description of the embodiments of the present invention, a detailed description of known functions and configurations incorporated herein will be omitted when it may obscure the subject matter of the embodiments of the present invention.

The present invention may reduce the number of processes and the processing time for manufacture of an aluminum plate, thereby achieving an enhancement in productivity.

An aluminum plate manufacturing method using extrusion and rolling according to an exemplary embodiment of the present invention may be used in casing of various aluminum alloys. Preferably, the aluminum plate manufacturing method is suitable for manufacture of a plate of a 5052 aluminum alloy used for manufacture of a battery case, a can, a pack housing, etc.

Hereinafter, the present invention will be described mainly in conjunction with manufacture of a 5052 aluminum alloy plate.

The aluminum plate manufacturing method using extrusion and rolling according to the exemplary embodiment of the present invention is a method of manufacturing an aluminum alloy plate usable as a material of a can or a case for batteries, and includes a melting and alloying step of melting and alloying an aluminum ingot and an alloying agent, a cleaning step of introducing a flux into a melt and stirring the melt using nitrogen (N) gas, to remove foreign matter from the melt, for management of a cleaning degree of the melt, and managing the cleaning degree of the melt through gas bubbling filtration (GBF) and use of a ceramic foam filter before casting of a billet, a billet casting step of manufacturing a billet having a predetermined width, a predetermined thickness and a predetermined length, a homogenization annealing step of thermally treating the billet, for removal of segregations formed during solidification in the billet casting step, a scalping step of machining a surface of the billet, for removal of an oxide layer present at the surface of the billet before extrusion, a continuous hot extrusion step of extruding the billet to a thickness of 9 to 15 mm at a high temperature of 500 to 600° C., a coiling step of coiling a continuously-extruded plate by a coiling device while applying tension to the plate, thereby forming the plate into a coil, a cold-rolling step of rolling a resultant extruded aluminum alloy plate to have a thickness corresponding to 20 to 30% of a thickness of the extruded plate, a tension leveling step of passing the rolled plate through a tension leveler, to secure a desired flatness of the plate, and a cutting step of cutting the plate securing a desired flatness into a size suitable as a size of a commercial product.

The melting and alloying step is a step of mixing and melting a general 5052 aluminum composition, thereby alloying the composition.

In the melting and alloying step, it is necessary to remove hydrogen gas, oxides, inclusions, foreign matter, etc. present in a melt by introducing a flux into the melt and stirring the melt using nitrogen (N) gas. Hydrogen gas may form bubbles at a surface of a plate formed through rolling after extrusion, during annealing of the plate. Therefore, hydrogen gas should be removed. Oxides, inclusions, foreign matter, etc. may degrade welding force at billet connection portions during extrusion. As a result, the billet connection portions may be a starting point of cracks during rolling and, as such, rupture of the billet connection portions may occur. Therefore, oxides, inclusions, foreign matter, etc. should be removed.

To this end, the cleaning step is performed. The cleaning step includes a primary cleaning step of removing impurities (oxides, inclusions, foreign matter, etc.) from the alloyed melt by introducing a flux into the alloyed melt and stirring the molten alloy using nitrogen (N) gas, a secondary cleaning step of removing hydrogen gas and impurities from the melt by stirring the primarily-cleaned melt using argon (Ar) gas while passing the melt through a gas bubbling filter (GBF), and a tertiary cleaning step of removing impurities from a secondarily cleaned aluminum alloy while passing the aluminum alloy through a ceramic foam filter. After execution of these cleaning steps, the melt is cast into a billet.

The billet casting step is a step of molding an aluminum alloy melted in the melting and alloying step, thereby producing an ingot having a predetermined size. In accordance with the standard of a final product, the ingot may have various sizes.

The cast billet has an ingot structure during solidification. As solute atoms are segregated at grain boundaries of the ingot structure, it is necessary to eliminate segregation through annealing. To this end, homogenization annealing is performed at 450 to 600° C. for 8 to 20 hours. The homogenization annealing time may be varied in accordance with a diameter of the billet.

The billet completely subjected to homogenization annealing should be subjected to scalping in order to remove an oxide layer and an inverse segregation layer from a surface thereof before introduction thereof into an extruder. It may be possible to prevent oxides from being introduced into billet connection portions in an extrusion container, through scalping. Scalping is performed to a depth of about 0.1 to 1 mm from the surface of the billet in accordance with a depth of the segregation layer.

The hot extrusion step is a step of manufacturing a plate having a predetermined thickness by heating the aluminum alloy billet to 500° C. or more, and applying pressure to the heated aluminum alloy billet.

Heat applied in the hot extrusion step is preferably 500° C. or more.

Although an outlet temperature at the hot extrusion step is less than 500° C., the surface of the extruded product may appear good to the naked eye. In this case, however, welding force at billet connection portions is low. For this reason, when a high-strength alloy such as a 5052 aluminum alloy is extruded under the condition that tension of 1 to 3% or more is applied, rupture of the billet connection portions may occur. Furthermore, rupture may also occur due to a pressure of rollers during rolling.

Of course, when the temperature in the hot extrusion step is excessively high, namely higher than 600° C., the billet may be melted, or problems of generation of edge cracks, surface oxidation, etc. may occur during extrusion. Therefore, temperature control should be performed such that an appropriate extrusion temperature is maintained. This temperature may be controlled by checking a preheating temperature, an extrusion speed and an extrusion pressure of the billet and a container temperature during the extrusion procedure.

In conventional cases, technology for adjusting a thickness of a product through hot rolling is used. In this case, when a hot-rolled plate is subjected to cold rolling, the cold rolling is generally performed such that the thickness of the plate does not exceed a maximum of 8 mm. In spite of execution of cold rolling, the rolled plate still does not have a dense texture. For this reason, the plate may be torn during a processing process such as drawing or the like in a procedure of forming the plate into a product. In accordance with the present invention, however, hot extrusion substituted for hot rolling is performed to obtain a thickness of 10 mm and, as such, execution of cold rolling is increased. Accordingly, it may be possible to obtain a denser texture of the plate after rolling. By virtue of such a denser texture, it may be possible to prevent tearing of the plate when bending work is carried out using a press or the like after rolling.

In addition, in conventional hot rolling, there is a problem in that rolled crystals rather than a recrystallized structure are formed. In hot extrusion, however, a reduced amount of rolled crystals is formed by virtue of microstructures recrystallized through hot extrusion at a high temperature, as compared to conventional cases in which both hot rolling and cold rolling are performed. Accordingly, it is possible to further reduce tearing or rupture occurring during pressing.

Preferably, the hot extrusion step is performed under a pressure of 200 bar or more and at a speed of 1.0 to 5.0 mm/s with reference to a ram speed.

The pressure and speed in the hot extrusion step is set to be equal to or more than the above-described ranges, and maximum ones thereof may be adjusted in accordance with monitoring of a state of the billet and a state of the extrusion mold in an extrusion procedure.

As hot extrusion conditions are set as described above, it may be possible to prevent connection portions of billets from being disconnected or weakened during manufacture of an elongated plate having the form of a coil through continuous hot extrusion of a plurality of billets.

The cold rolling step is a step of pressing the plate processed to have a predetermined thickness in the hot extrusion procedure such that the pressed plate has a reduced thickness and an increased texture density. The plate is rolled to a thickness corresponding to 20 to 30% of the thickness of the plate produced in the hot extrusion step.

The cold rolling step may be repeatedly performed about 2 to 5 times. The thickness of the plate after execution of the cold rolling step corresponds to 20 to 30% of the thickness of the plate produced in the hot extrusion step.

That is, it is preferred that the thickness of the plate produced in the hot extrusion step be 10 mm, and the thickness of the plate rolled in the cold rolling step be 4 mm.

In addition, stress removal and texture recrystallization are preferably performed after the cold rolling step. To this end, an annealing step is preferably further performed.

As annealing conditions for a 5052 aluminum plate in the annealing step, an annealing temperature of 300 to 400° C. and an annealing time of 1 to 5 hours are preferable.

After execution of the annealing step, rolling for generation of material properties should be performed. The rolling step for generation of material properties is a process of reducing a thickness of the rolled plate in order to satisfy required basic characteristics of the rolled plate. As the plate, which has a thickness of 4 mm, is processed to have a thickness of 3 mm, desired material properties are provided. The thickness reduction rate may be varied in accordance with required characteristics.

In order to achieve an increase in strength and recovery of degraded physical properties, for example, elongation, the rolled plate is preferably further subjected to thermal treatment for stabilization. In the thermal treatment for stabilization, the rolled plate is treated at 120 to 180° C. for 1 to 5 hours. As the rolled plate is thermally treated after execution of the rolling step for generation of material properties, the rolled plate may satisfy basic physical properties of the 5052 aluminum plate.

The tension leveling step is a planarization step. When a rolled coil is used for general purposes such as construction purposes or the like, the rolled coil may be used without further processing because flatness thereof is not important. However, when the rolled coil is used for an element such as a battery case of an electric vehicle or the like, flatness thereof is important. In this case, accordingly, the rolled plate should secure flatness in front, rear, left and right sides. The tension leveling step is a step for securing such flatness.

The coiling step is a step of coiling an aluminum plate formed to have an elongated plate shape such that the aluminum plate has a coil shape. Generally, the coiling step may be performed by a coiling device configured to coil an aluminum plate.

However, an aluminum plate having a great width may not be uniformly wound on a coiling roll and, as such, opposite ends of a coil may be non-uniform. Non-uniform portions of the coil wound to be non-uniform at opposite ends thereof must be cut for removal thereof. For this reason, material waste may be generated.

Figure 3:
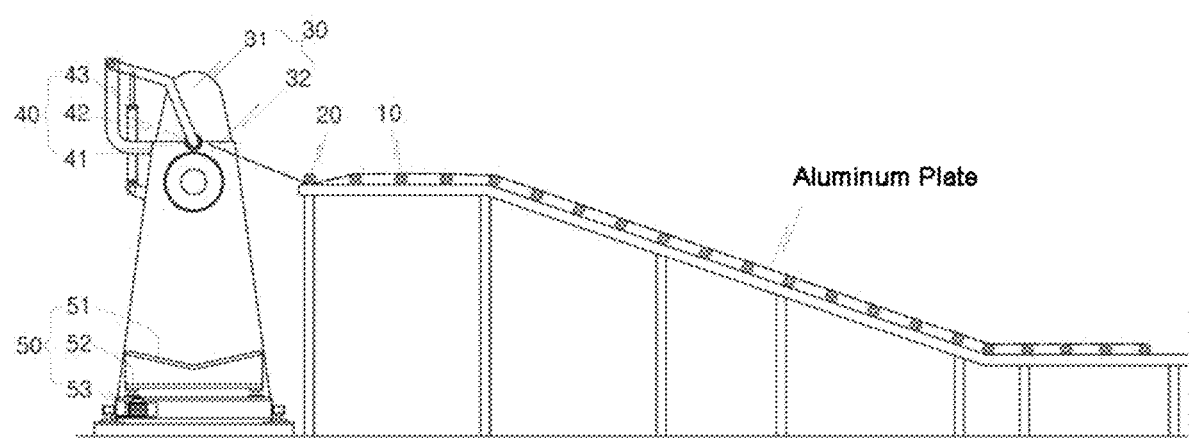
FIG. 3 is a front view of an example of a coiling device used in the aluminum plate manufacturing method using extrusion and rolling according to the exemplary embodiment of the present invention.

To this end, as shown in FIG. 3, in accordance with an exemplary embodiment of the present invention, the coiling device is preferably configured through inclusion of a plurality of feeding rollers 10 configured to feed an extruded aluminum alloy plate, a pinch roller 20 installed at a rear end of a feeding table, to press the plate, for application of tension to the plate fed by the feeding rollers 10, a coiler 30 including a winding drum 32 configured to rotate in accordance with driving of a driver 31, thereby winding the plate on the winding drum 32, and a guide 40 configured to guide the plate such that the plate is uniformly wound without escaping from an end of the winding drum 32.

As shown in FIG. 3, the feeding rollers 10 are installed to be spaced apart from one another by a uniform distance. Accordingly, the feeding rollers 10 support a rolled or extruded aluminum plate such that the plate moves smoothly without resistance.

A part of the feeding rollers 10 is installed such that neighboring ones thereof are disposed at the same level. However, a part of the feeding rollers 10 installed adjacent to the coiler 30 is installed along an inclined surface such that the feeding rollers 10 thereof are disposed at higher levels while being nearer to the coiler 30, respectively. Accordingly, the plate fed to the coiler 30 receives force in a direction opposite to the coiler 30 and, as such, maintains tension when being coiled by the coiler 30. Thus, uniform coiling may be achieved.

Of course, some feeding rollers 10 disposed adjacent to the coiler 30 are horizontally maintained, as shown in FIG. 3, such that the aluminum plate is stably supplied to the coiler 30.

As shown in FIG. 3, the pinch roller 20 is installed at a front end of the coiler 30. The pinch roller 20 functions to press an upper surface of the plate such that the plate fed along upper portions of the feeding rollers 10 is suppled in a state of closely contacting the winding drum 32 of the coiler 30. The pinch roller 20 may be installed to face upwards or may be installed to face downwards.

The coiler 30 is a device configured to wind an aluminum plate in the form of a coil. Similarly to a general coiler, the coiler 30 includes the winding drum 32 configured to rotate by the driver 31.

However, the guide 40 is further installed at one side of the winding drum 32. At least one slit 32g extending in a width direction of the plate is formed at the winding drum 32 in order to fix one end of the plate. That is, the aluminum plate coiling device according to the exemplary embodiment of the present invention is a device configured to wind an aluminum plate having a thickness of 3 to 10 mm in the form of a coil. Even when the plate is separated from the winding drum 32 in a state of being wound around the winding drum 32 in the form of a coil, the plate may maintain the coil form, without provision of a winding roll as in the case of a thread coil or a film coil. However, it is necessary to fix one end of the plate to the winding drum 32. To this end, the slit 32g is formed. Of course, the slit 32g is narrowed when the completely-wound coil is separated from the winding drum 32 and, as such, may also function to allow the coil to be easily separated from the winding drum 32.

The guide 40 guides the aluminum plate to be supplied to a predetermined portion of the winding drum 32 during winding. The guide 40 includes a pushing roller 41 installed at one end of a pivoting rod pivotally mounted to the coiler 30 at the other end thereof, and configured to press, toward the winding drum 32, the plate fed to a position over the winding drum 32, guide plates 42 respectively installed at opposite ends of the pushing roller 41 and configured to guide the plate to be wound on the winding drum 32 while preventing opposite edges of the plate from escaping from the winding drum 32, and a pivoting device 43 configured to pivot the pivoting rod, thereby causing the pushing roller 41 to always be urged against the winding drum 32.

In the guide 40 configured as described above, the pushing roller 41 presses the plate wound on the winding drum 32 such that a currently wound portion of the plate is maintained in a state of closely contacting an already wound portion of the plate, and the guide plates installed at opposite ends of the pushing roller 41 guide winding of the currently wound portion of the plate such that opposite ends of the currently wound plate portion do not escape from opposite ends of the already wound plate portion.

In addition, in the coiling device according to the exemplary embodiment of the present invention, a coil discharging device 50 is further installed under the winding drum 32.

The coil discharging device 50 is a device configured to separate the plate coil wound on the winding drum 32 from the coiler 30, and then to discharge the separated plate coil. The coil discharging device 50 includes a coil bogie 51 configured to support a plate coil separated from the winding drum 32, a guide rail 52 configured to guide movement of the coil bogie 51, and a driver 53 configured to move the coil bogie 51 along the guide rail 52.

In addition, although not shown, the coiling device further includes an encoder configured to adjust a coiling speed of the coiling device and a extrusion speed at an outlet of the extruder to be equal to each other. In conventional cases, a large-size underground pit is constructed due to a difference between a coiling speed and an extrusion speed at an outlet of the extruder. In the present invention, however, such a pit is eliminated by virtue of the encoder and, as such, there is an advantage of an enhancement in space efficiency.

As apparent from the above description, the aluminum plate manufacturing method through extrusion and rolling according to the exemplary embodiment of the present invention is significant in that continuous rolling of an extruded plate, which is known to be impossible, is possible through the method of the present invention. Although a long processing time is taken and a number of processes is performed in hot rolling of a slab in which rolling is performed several to several tens of times, such hot rolling is substituted by extrusion in a single pass in accordance with the present invention. Thus, there is an effect of reducing the number of processes and the processing time, thereby achieving an enhancement in productivity.

In addition, in accordance with the present invention, hot rolling is substituted by hot extrusion and, as such, a cold-rolled plate with a width of 1 m or less may be easily produced. In particular, a hot rolling process for high-strength alloys of, for example, 2000, 5000, and 7000 series may be greatly reduced in number of processes and processing time. Accordingly, there are effects of reducing processes and costs in production of a high-strength alloy.

Furthermore, a thickness difference between a thickness in an initial stage of extrusion and a thickness in a final stage of extrusion generated when a plate is extruded to a predetermined thickness and a thickness difference of a product generated as a flow of metal is varied in accordance with a shape of the product are corrected through rolling in accordance with the present invention. Accordingly, there is an effect of producing an aluminum plate having a uniform thickness.

In addition, in accordance with the present invention, the thickness in hot extrusion is greater than the thickness in hot rolling in order to increase execution of cold rolling. Accordingly, the texture of the plate obtained after rolling becomes denser. Since the plate has a denser texture, as described above, there is an effect of preventing the plate from being torn when the plate is subjected to bending work using a press, etc. after rolling.

In addition, although cold rolling is performed in accordance with the present invention, formation of rolled crystals is reduced, as compared to conventional cases in which a product is manufactured through hot rolling and cold rolling. Accordingly, there is an effect of further reducing tearing or rupture of a product occurring during pressing.

In addition, an extrusion outlet speed and a coiling speed are linked through an encoder. Accordingly, an underground pit for preventing breakage of the coiler due to a speed difference is unnecessary. Accordingly, there is an effect of achieving a reduction in space.

Furthermore, it is known that a tensioner, which applies separate tension to a coiler such that the coiler can achieve tight coiling, is essential. In accordance with the present invention, however, tension is naturally applied to an extruded plate as the direction in which the extruded plate passes through a feeding table is changed. Accordingly, it is unnecessary to install a tensioner. Thus, there is an effect of simplifying equipment.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of manufacturing an aluminum alloy plate for a battery case, the method comprising:
    a melting and alloying step of melting and alloying a composition for manufacture of the aluminum alloy plate;
    a cleaning step of removing foreign matter from a resultant melt, for management of a cleaning degree of the melt;
    a billet casting step of manufacturing a billet having a predetermined width, a predetermined thickness and a predetermined length from the composition;
    a scalping step of removing oxides, foreign matter and an inverse segregation layer from a surface of the billet;
    an extrusion step of extruding the billet at a temperature in a range of 500° C. to 600° C., under a pressure of 200 bar or more, and at a speed in a range of 1.0 to 5.0 mm/s for producing the aluminum alloy plate having a thickness in a range of 9 to 15 mm;
    a coiling step of coiling the aluminum alloy plate having the thickness in the range of 9 to 15 mm using a coiling device while applying tension to the aluminum alloy plate, wherein the coiling step directly follows the extrusion step;
    a cold-rolling step of rolling the aluminum alloy plate having the thickness in the range of 9 to 15 mm so that the rolled aluminum alloy plate has a thickness in a range of 20 to 30% of the thickness of the aluminum alloy plate having the thickness in the range of 9 to 15 mm;
    an annealing step of annealing the rolled aluminum alloy plate following the cold-rolling step for stress removal and texture recrystallization, wherein the annealing step is performed in a range of 300 to 400° C. for 1 to 5 hours;
    a stabilization step of increasing strength and recovering physical properties causing degradation in elongation of the aluminum alloy plate in the cold rolling step, wherein the stabilization step is performed in a range of 130 to 180° C. for 1 to 5 hours;
    a tension leveling step of subjecting the rolled aluminum alloy plate to tension leveling, to secure a desired flatness of the aluminum alloy plate; and
    a cutting step of cutting the aluminum alloy plate after the tension leveling, for manufacture of the battery case using the cut aluminum alloy plate.

2. The method according to claim 1, wherein:
    the coiling device comprises:
        a plurality of feeding rollers configured to feed the aluminum alloy plate;
        a pinch roller configured to press the aluminum alloy plate fed by the feeding rollers toward a coiler;
        the coiler comprising a winding drum configured to rotate in accordance with driving of a driver, thereby winding the plate on the winding drum; and
        a guide configured to guide the aluminum alloy plate such that the aluminum alloy plate is uniformly wound without escaping from an end of the winding drum.

3. The method of claim 2, wherein the guide includes a pushing roller installed at one end of a pivoting rod pivotally mounted to the coiler at the other end thereof, and configured to press, toward the winding drum, the aluminum alloy plate fed to a position over the winding drum, guide plates respectively installed at opposite ends of the pushing roller and configured to guide the aluminum alloy plate to be wound on the winding drum while preventing opposite edges of the aluminum alloy plate from escaping from the winding drum, and a pivoting device configured to pivot the pivoting rod, thereby causing the pushing roller to always be urged against the winding drum.

* * * * *